United States Patent [19]

Snow

[11] 4,186,946
[45] Feb. 5, 1980

[54] ROTATABLE HOSE OR TUBE COUPLING
[75] Inventor: John P. Snow, Sagamore Hills, Ohio
[73] Assignee: Eaton Corporation, Cleveland, Ohio
[21] Appl. No.: 796,533
[22] Filed: May 13, 1977
[51] Int. Cl.² .................. F16L 27/08; F16L 33/20
[52] U.S. Cl. ........................... 285/94; 285/169; 285/174; 285/256; 285/276; 285/305; 285/382.4; 29/523
[58] Field of Search ............ 285/276, 382.4, 305, 285/321, 388, 387, 382, 94, 174, 256, 169; 29/520, 523

[56] References Cited
U.S. PATENT DOCUMENTS

| | | | |
|---|---|---|---|
| 1,375,822 | 4/1921 | Borgeson | 285/382.4 X |
| 1,450,126 | 3/1923 | Wilson | 285/382.4 X |
| 2,310,250 | 2/1943 | Melsom | 285/276 X |
| 2,455,544 | 12/1948 | Yonkers | 285/276 X |
| 2,661,225 | 12/1953 | Lyon | 285/256 X |
| 2,929,131 | 3/1960 | McCloskey | 29/523 X |
| 3,139,666 | 7/1964 | Leciejewski | 29/523 X |
| 3,507,532 | 4/1970 | Gross et al. | 285/305 X |
| 3,606,402 | 9/1971 | Medney | 285/305 |
| 3,759,553 | 9/1973 | Carter | 285/305 X |
| 3,778,090 | 12/1973 | Tobin | 29/523 X |
| 3,900,221 | 8/1975 | Fouts | 285/276 |
| 4,019,244 | 4/1977 | Owen et al. | 29/520 |
| 4,050,722 | 9/1977 | Berger et al. | 285/321 X |

FOREIGN PATENT DOCUMENTS 1182483 11/1964 Fed. Rep. of Germany ........... 285/305
703786 2/1954 United Kingdom ....................... 29/523
839680 6/1960 United Kingdom ..................... 285/276

Primary Examiner—Thomas F. Callaghan
Attorney, Agent, or Firm—R. J. McCloskey; J. Yakimow; A. Chrow

[57] ABSTRACT

A rotatable coupling member for attachment to an end or between the ends of hose or tubing to be used in the conveyance of a fluid under pressure. The coupling member comprises a first body member having means disposed at one end thereof for attaching the first body member to a source of fluid and a substantially tubular shaped insert extending away from a second end thereof into an axially aligned receiving bore disposed at a first end of a second body member that provides a fluid interconnecting relationship to a second end of the second body member having means disposed thereat for attachment to a source of fluid. An annular retainment groove having a cross-sectional shape capable of being altered as a result of an axial compressive force being applied to the insert is disposed in the first body member insert outer wall. An annular retainment receiving groove is disposed in the inner wall of the receiving bore and is axially aligned with the insert retainment groove so that retainment means such as, for example, an arcuate shaped wire, originally disposed in the insert retainment groove, is caused to extend radially outwardly therefrom into the second body member retainment receiving groove as a result of axially compressing the insert to provide a rotatable, interlocked relationship between the first and second body members.

28 Claims, 24 Drawing Figures

ROTATABLE HOSE OR TUBE COUPLING

This invention relates generally to a coupling member adapted for attachment to the end of a hose or tube used for the conveyance of a fluid under pressure and more particularly to an improved coupling member that provides a rotatably interlocked means of coupling between the ends of a hose or tube or coupling a hose or tube to a fitting attached to a source of fluid.

BACKGROUND OF THE INVENTION

Coupling members adapted for attachment to the end of hose or tubing for use in the transfer of fluids under pressure from one point to another are well known in the prior art. Rotatable couplings heretofore available have generally been made by either carefully compressing an annular portion of an outer member of the coupling radially inwardly into a groove of an inner member such that the two are rotatably inter-locked or by placing a releasable locking clip through the outer member of the coupling such that it passes through a portion of an annular groove in the inner member and thereby interlocks the two in rotatable relationship. Hose couplings having externally mounted interlocking devices are shown, for example, in U.S. Pat. No. 1,019,000 issued Feb. 27, 1912 which discloses an externally mounted forked wedge as a means of interlocking hose sections and in U.S. Pat. No. 1,871,421 issued Aug. 9, 1932 which requires complex external studs and machined slots. Other examples are shown in U.S. Pat. No. 1,838,549 issued Dec. 29, 1939 in which a valved coupling requires a coupling externally mounted jaw and in German Pat. No. 1,425,470 issued Nov. 21, 1968 which discloses a socket connection using an externally mounted clip as a means of securing the connector members. Further examples are shown in U.S. Pat. Nos. 3,538,940 issued Nov. 10, 1970 and 3,560,027 issued Feb. 2, 1971, which generally disclose complex coupling assemblies respectively having externally mounted clips and retainment clips as a means of securing mating parts and in U.S. Pat. Nos. 2,772,898 issued Dec. 4, 1956 and 3,523,701 issued Aug. 11, 1970 which respectively disclose an externally mounted retaining clip and spring clip as a means of interlocking mating parts of the coupling. The above noted references generally have the disadvantage of requiring complex machined parts or specialized sealing arrangements because of penetrations made into the internal flow chambers by externally mounted retainment or interlocking devices or in many cases are limited to low pressure operation because of inherent design limitations. None of the above references disclose or suggest a coupling member having concealed retainment means providing a rotatable inter-locked relationship between its member parts that is adapted for attachment to an end or between the ends of a hose or tube used in the conveyance of fluids under pressure nor do they teach a method of providing the secured relationship of the invention as hereinafter described.

SUMMARY OF THE INVENTION

It is an object of this invention to provide an improved rotatable coupling member adapted for attachment to the end of a hose or tube to be used in the conveyance of a fluid under pressure. It is a further object of this invention to provide an improved rotatable coupling member having compressive means for providing a rotatable interlocking relationship between its member parts. It is another object of this invention to provide an improved coupling member having concealed means for providing a rotatable inter-locked relationship between its member parts. It is still a further object of this invention to provide an improved coupling member having concealed means compressively provided to secure an axial interlocking rotatable relationship between its member parts. It is yet a further object to provide a method of securing a rotatable interlocking relationship between the member parts of the improved coupling member of this invention.

BRIEF DESCRIPTION OF THE DRAWINGS

Other objects will become apparent from the following description with reference to the accompanying drawing in which.

DESCRIPTION OF THE PREFERRED EMBODIMENTS

Figure 1:
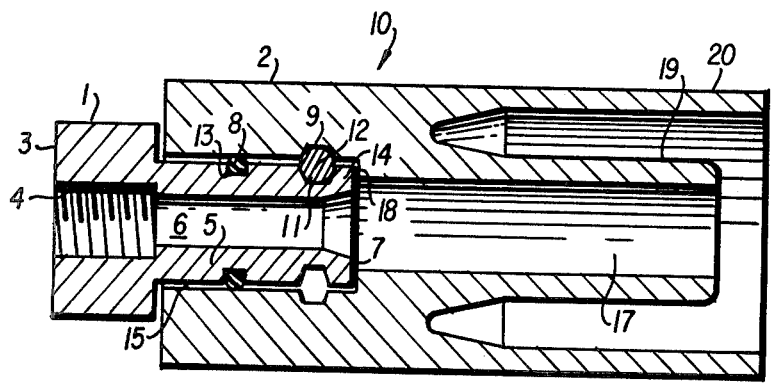
FIG. 1 is a longitudinal section taken through the central longitudinal axis of an embodiment of the invention.

Referring now to FIG. 1 in which an embodiment of coupling member 10 having a body member 1 rotatably interlocked with a body member 2 in accordance with the invention is shown. Body member 1 has female connecting member 3 having inner threads 4 disposed therein at a first end of body member 1 for coupling member 10 to a fitting attached to a source of fluid. A substantially tubular shaped insert member 5 extends away from a second end of body member 1 to an outer end 7 thereof. In the example shown, a single bore 6 extends between the connecting member end 3 and the outer end 7 of member 5. Annular retainment groove 11 disposed in the outer wall of member 5 is axially spaced from outer end 7 to provide an annular shoulder 14 therebetween. Annular groove 13, having resilient sealing means such as O-ring 8 disposed therein, is axially spaced in outer wall of member 5 between annular groove 11 and the first end of body member 1.

Body member 2 has receiving bore 15 disposed at a first end thereof. The inner wall of receiving bore 15 is disposed about the outer wall of member 5 and has an annular retainment receiving groove 9 disposed therein that is axially spaced from the body member 2 first end and is substantially axially aligned with and disposed radially outward from groove 11. Counterbore 17, has a diameter smaller than the diameter of bore 6 and communicates therewith. The end of body member 2 opposite from member 1 has a shell 20 and a radially inwardly spaced tubular nipple 19 which has an end spaced axially inwardly from the end of shell 20. Counterbore 17 extends from bore 6 through nipple 19 and an annular space is provided between nipple 19 and shell 20 to accommodate the wall of a hose when nipple 19 is inserted in the bore thereof. In attaching body member 2 to the end of a hose or tube, nipple 19 is inserted into the bore of the hose or tube and shell 20 is compressed radially inwardly towards nipple 19 to secure the wall of the hose or tube disposed between nipple 19 and shell 20. An annular shoulder 18 is formed by the juncture of bores 6 and 17.

In the example shown in FIG. 1, retainment means 12, hereinafter described, extends radially outward from insert retainment groove 11 such that a portion thereof extends into annular retainment receiving groove 9 in the wall of receiving bore 15 to provide a rotatable interlocked relationship therewith.

The outer diameter of resilient O-ring sealing means 8 and retainment means 12, when disposed in their respective grooves 11 and 13, are such that insert 5, containing O-ring 8 and retainment means 12, can be inserted into receiving bore 15 for a distance suitable to substantially axially align grooves 11 and 9, whereupon axial compression of insert 5 alters the cross-sectional shape of groove 11 in such a manner as to displace a portion of retainment means 12 radially outwardly into receiving groove 9 to provide a rotatable interlocked relationship between body members 1 and 2.

The cross-sectional shape of retainment means 12 and of grooves 11 and 9 are important in providing suitable radial outward displacement of retainment means 12 upon axial compression of member 5. In the embodiment of FIG. 1, insert member 5 may be axially compressed, for example, by insertion of a suitable mandrel through counterbore 17 from the second end of body member 2 that impinges on the outer end 7 of member 5 and compresses member 5 to cause an alteration of the original cross-sectional shape of retainment groove 11 while resisting radial expansion of the outer wall of member 5 sufficiently enough to permit rotation between the outer wall of member 5 and the inner wall of receiving bore 15. Although the example of FIG. 1 shows that a suitable mandrel might be inserted through bore 17 from the second end of body member 2 to axially compress member 5, it is to be understood that if member 2 were designed in such a manner to make it impossible for such mandrel insertion, that annular facing wall 18 adjacent insert outer end 7 upon proper dimensioning may also provide a means of stopping the axial movement of member 5 relative to receiving bore 15 such that an axial force along central longitudinal c would cause compressive deformation of member 5 and alter the cross-sectional shape of retainment groove 11 as required to provide the rotatable interlocked relationship between body members 1 and 2.

Figure 2:
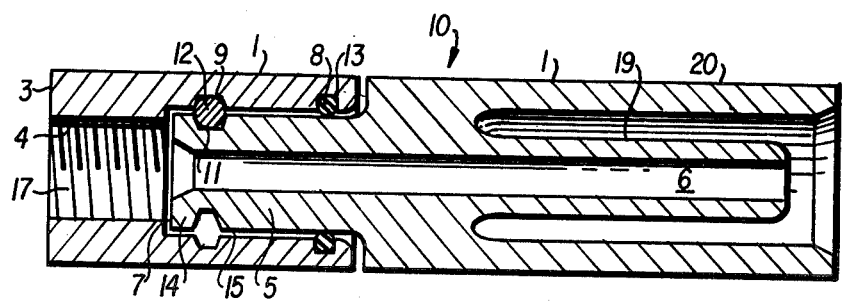
FIG. 2 is a longitudinal section taken through the central longitudinal of another embodiment of the invention.

FIG. 2 shows an embodiment of coupling member 10 of the invention wherein the first end of body member 1 has a permanently attachable coupling extending away therefrom comprising nipple 19 for insertion into the bore of a hose or tube and shell 20 disposed coaxially about and radially outward from nipple 19 such that the wall of a hose or tube end may be inserted in the space therebetween and be permanently connected thereto by compressing shell 20 radially inward towards nipple 19. As in the example shown in FIG. 1, substantially tubular member 5 extends away from the second end of body member 1 to an outer end 7 thereof. Annular retainment groove 11 disposed in the outer wall of member 5 is spaced axially from the outer end 7 of member 5 to provide an annular shoulder 14 therebetween. The second end of body member 2 of coupling member 10 has female connecting member 3 having internal threads 4 disposed therein for coupling body member 2 to a fitting attached to a source of fluid. Receiving bore 15, extends away from the first end of body member 2 and is axially aligned with bore 6 in body member 1. Receiving bore 15 is disposed in encompassing relationship about insert 5. Annular retainment receiving groove 9 is disposed in the inner wall of receiving bore 15 in substantial axial aligned relationship radially outwardly from annular retainment groove 11 in member 5.

In the embodiment of FIG. 2, annular groove 13, having resilient sealing means such as O-ring 8 disposed therein, is spaced axially in the inner wall of receiving bore 15 between annular groove 9 and the second end of body member 1. Retainment means 12 extends radially outwardly from groove 11 into groove 9 to provide a rotatable axial secured relationship between the first and second body members. Annular wall 18 facing the outer end 7 of member 5 is formed between bores 17 and 15 as a result of axially aligned bore 17 having a smaller diameter than receiving bore 15. In the example shown, member 5 may be axially compressed by insertion of a suitable mandrel into the second end of body member 2 or, by suitable dimensioning of wall 18, applying a compressive force along the central longitudinal axis c causing outer end 7 of member 5 to impinge upon wall 18 and axially compress member 5 in such a manner as to cause alteration of the cross-sectional shape of groove 11 so as to displace a portion of retainment means 12 radially outwardly from groove 11 into groove 9 to provide a rotatable interlocked relationship between body members 1 and 2. It is to be understood that the positioning of the sealing means and grooves, if any, related thereto is for illustrative purposes only and that, dependent upon design requirements, any type, position or number of sealing grooves and/or resilient sealing means, such as O-rings, disposed therein between the rotatable interlocked body members of any embodiment of coupling member 10 made in accordance with the invention is considered within the scope hereof.

Figure 3:
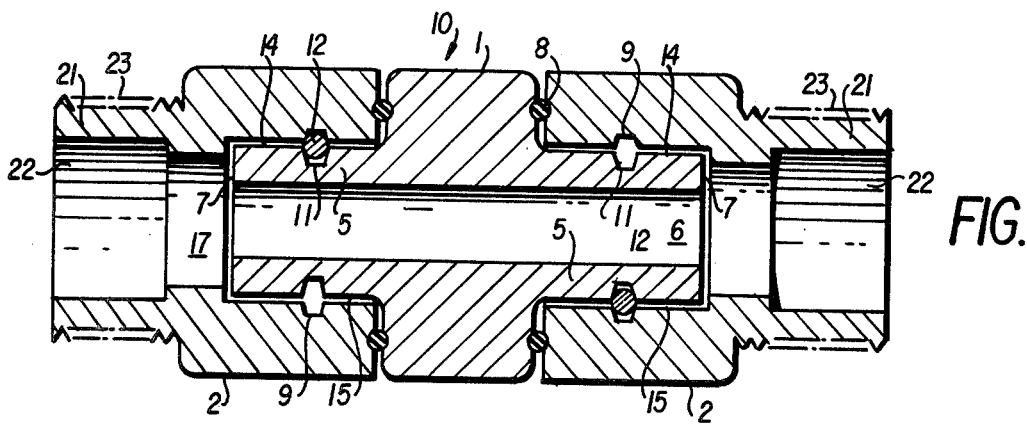
FIG. 3 is a longitudinal section taken through the central longitudinal axis of another embodiment of the invention.

FIG. 3 illustrates a variation within the scope of the invention wherein an embodiment of coupling member 10 has two body members 2 rotatably interlocked with a single body member 1 in a manner provided by the invention. In the example shown, axially aligned, substantially tubular members 5, having bores 6 therethrough, extend oppositely away from body member 1. Both members 5 are inserted into receiving bores 15 disposed at the first ends of body members 2. In the example shown in FIG. 3, the male connecting means 21 disposed at the second ends of body members 2 comprises means for releasably attaching the second ends of body member 2 to the end of a hose or tube such as, for example, inserting the hose or tube end into bore 22 disposed therethrough and engaging a nut having a compressible ferrule (not shown) with external threads 23 disposed in the outer wall of connecting means 21. Intermediate bores 17 are axially aligned with bores 6 and 22 and provide a fluid interconnecting relationship between the releasable connecting means disposed at the second ends of body members 2 hereinbefore described. As in previous examples, body member 1 and 2 are rotatably interconnected in accordance with the invention. Although it is preferred to locate annular retainment groove 11 in the outer wall or member 5 nearer to outer end 7 of member 5 than to the second end of body member 1 (such as shown, for example, in FIGS. 1 and 2), FIG. 3 illustrates where annular retainment groove 11 may be axially spaced in the outer wall of member 5 at any suitable distance from outer end 7. In the embodiment shown in FIG. 3, annular retainment grooves 11 are disposed in the outer wall of members 5 approximately at the mid-point between outer ends 7 of members 5 and the second ends of body member 1. Generally, the axial location of annular retainment groove 11 in the outer wall of the insert member; the cross-sectional shape of annular retainment groove 11; the cross-sectional shape of annular retainment receiving groove 9; the form and cross-sectional shape of retainment means 12; and the thickness of the annular wall between the bottom of the annular retainment groove and the inner wall of the insert bore are taken into account in making a rotatable interlocked coupling member in accordance with the invention.

Figure 4:
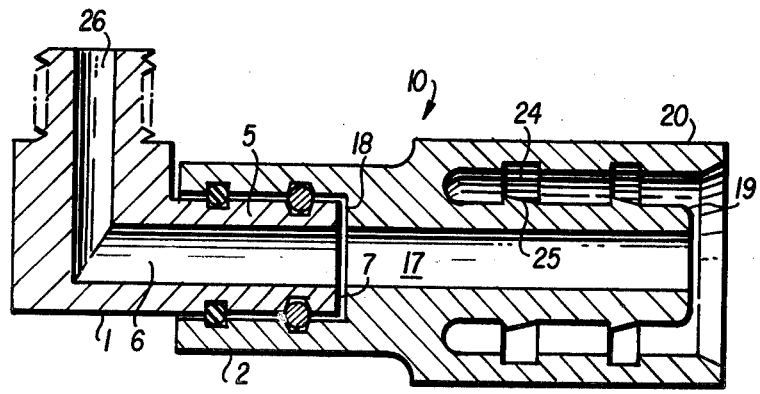
FIG. 4 is a longitudinal section taken through the central longitudinal axis of an embodiment of the invention having more than one bore in its first body member and having means for improving the gripping attachment to the end of a hose or tube.

FIG. 4 shows an embodiment of a coupling member 10 made in accordance with the invention and having additional features of interest. In FIG. 4, the second end of body member 1 is rotatably interlocked with the first end of body member 2, in accordance with the invention. Bore 17 extends through body member 2 from the second end thereof and is in axial fluid connecting relationship with bore 6 which is disposed in insert member 5 at the second end of body member 1. Bore 26 is disposed in the first end of body member 1 and provides a fluid interconnecting relationship with bore 6. Means for directly permanently attaching body member 2 to the end of a hose or tube extend away from the second end of body member 2. The permanently attaching means comprises nipple 19 for insertion into the bore of a hose or tube to be attached and shell 20 disposed co-axially about nipple 19 such that a wall of the hose or tube disposed between shell 20 and nipple 19 can be permanently attached to body member 2 by compressing shell 20 radially inwardly towards nipple 19. Shown in FIG. 4, are axially spaced annular grooves 24 disposed in the inner wall of shell 20 and axially spaced annular barbs 25 disposed on the outer wall of the nipple 19. Both grooves 24 or barbs 25 may be used to improve the grip of body member 2 to the hose or tube to which it has been permanently attached. Grooves 24 may be provided in the inner surface of shell 20 to improve the grip thereof to the outer surface of the hose or tube and barbs 25 may be used to improve the grip of nipple 19 to the inner surface of the hose or tube bore. It is to be understood that examples, such as grooves 24 and barbs 25 are for illustrative purposes only, and that any means of improving the grip of a connecting means disposed respectively at the first and second ends of body members 1 and 2 that are rotatably interlocked in accordance with the invention is considered within the scope hereof. Although in the example shown in FIG. 4, body member 1 has bore 26 perpendicularly interconnecting with bore 6, it is to be understood that such an example is for illustrative purposes only and that, dependent upon design criteria, one or more bores may be disposed in either or both first and second body members in making a coupling member in accordance with the invention. FIG. 4 also illustrates a feature within the scope of the invention wherein bore 6, that extends longitudinally through insert member 5 of body member 1, may have a diameter smaller, the same as, or larger than the diameter of an adjacent bore in the second body member axially aligned with and intermediate the receiving bore and second end connecting means of the second body member. In the embodiment of FIG. 4, bores 6 and 17 are approximately the same size and outer end 7 of insert 5 is not available for impingement by a mandrel inserted through the second end of body member 2. In embodiments of the invention where outer end 7 of insert member 5 is not accessable to a mandrel inserted through the second body member second end, it is necessary to ratio the walls between the receiving bore and the second end of body member 2 such that annular wall 18, formed between the bores, is provided with sufficient annular surface facing outer end 7 of insert 5 to permit impingement of outer end 7 thereagainst in order to axially compress insert member 5 by forcing body members 1 and 2 together to make the coupling member of the invention.

Figure 5:
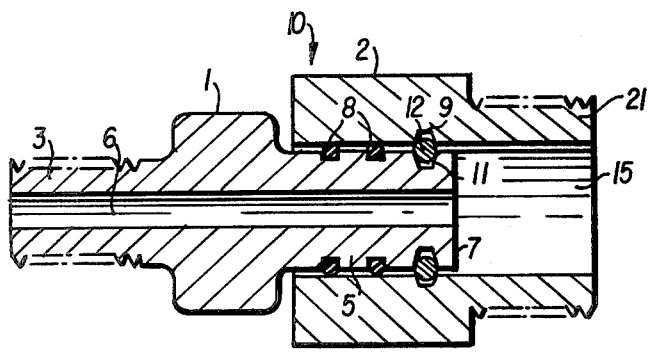
FIG. 5 is a longitudinal section taken through the central longitudinal axis of an embodiment of the invention having additional sealing means.

FIG. 5 shows an embodiment of coupling member 10 made in accordance with the invention having male connecting means 21 for directly releasably attaching body member 2 to the end of a hose or tube disposed at the second end of body member 2 and male connecting means 3 for coupling body member 1 to a fitting attached to a source of fluid disposed at the first end thereof. Shown in FIG. 5, is a pair of axially spaced resilient sealing means such as O-rings 8 disposed in the outer wall of insert member 5 which extends away from the second end of body 1. As hereinbefore recited, such an example of the paired sealing means, such as O-rings 8, is for illustrative purposes only and is meant to emphasize the point that any type, position and number of resilient means for sealing against fluid leakage between body members 1 and 2 that have been rotatably interlocked in accordance with the invention is considered within the scope hereof. Also illustrated in FIG. 5 is the absence of annular wall 18 (referenced in FIGS. 1 and 2). Receiving bore 15 extends through body member 2 such that bore 6 in body member 1 is in an axially aligned fluid interconnecting relationship with bore 15. For the example shown in FIG. 5, a suitable mandrel is required to be inserted into bore 15 at the second end of body member 2 and impinge on outer end 7 of insert 5 and axially compress insert 5 to alter the cross-sectional shape of annular retainment groove 11 disposed in the outer wall thereof so as to displace retainment means 12 disposed therein such that a portion of retainment means 12 extends into annular retainment receiving groove 9 to provide a rotatable interlocking relationship between body members 1 and 2.

Figure 6:
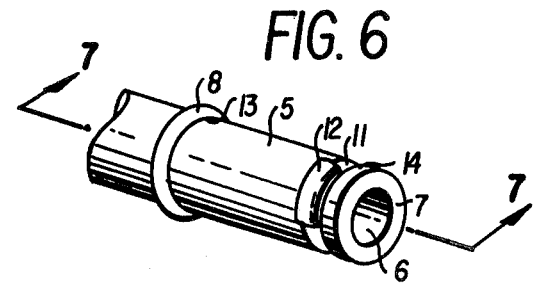
FIG. 6 is a fragmented perspective view of one example of an insert used in coupling members of the invention.
Figure 8A:
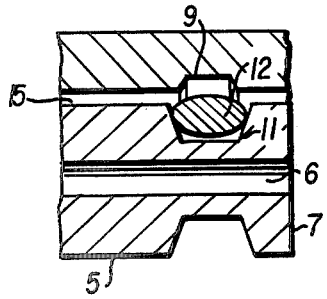
FIGS. 8A-F are a series of longitudinal section fragments taken through the central longitudinal axis of typical coupling members of the invention showing examples of retainment means and grooves used to hold and receive the retainment means.
Figure 8B:
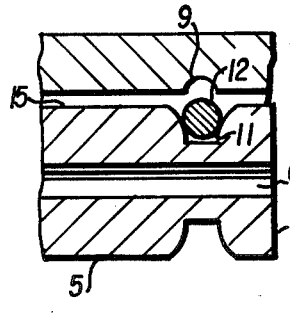
Figure 8C:
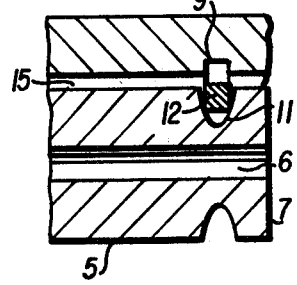
Figure 8D:
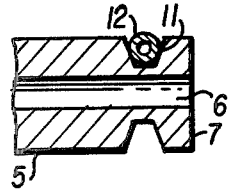
Figure 8E:
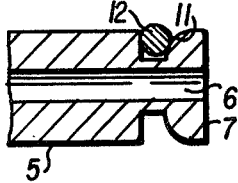
Figure 8F:
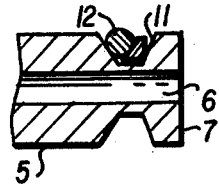
Figure 9A:
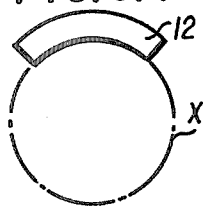
FIGS. 9A-D are a series of plan views of examples of retainment means used in coupling members made in accordance with the invention.
Figure 9B:
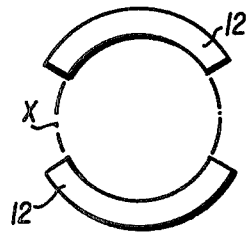
Figure 9C:
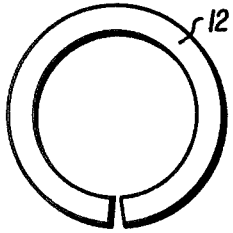
Figure 9D:
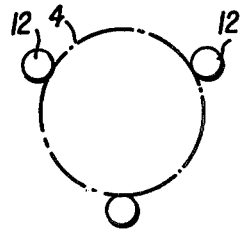

FIG. 6 illustrates an embodiment of the substantially tubular shaped insert 5 of the invention. Shown in FIG. 6 is bore 6 extending through insert 5 to an outer end 7 thereof and annular retainment groove 11 disposed in the outer wall of insert 5 that is axially spaced from outer end 7 to provide an annular shoulder 14 therebetween. Also shown in FIG. 6 is resilient O-ring 8 disposed in annular groove 13 that is axially spaced from outer end 7 in the outer wall of insert 5. An arcuate segment form of retainment means 12, hereinafter described, is disposed in annular retainment groove 11. The example shown in FIG. 6 has not yet been inserted into a receiving bore and compressed in accordance with the invention.

Figure 7:
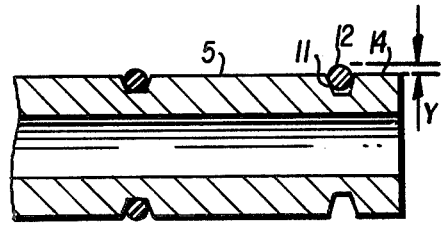
FIG. 7 is a fragmented longitudinal section taken through the central longitudinal axis along II—II shown in FIG. 6.

FIG. 7 is a longitudinal section fragment taken in the direction of II—II in FIG. 6 to illustrate that the radial distance Y between the outer diameter of retainment means 12, disposed in annular retainment groove 11 in the outer wall of insert 5, and the outer diameter of insert 5 is required to be such that insert 5, having retainment means 12 disposed therein, can be inserted into receiving bore 15 at the first end of body member 2 before insert 5 is axially compressed in accordance with the invention.

FIG. 8 in parts A, B and C illustrates examples of cross-sectional shapes of retainment grooves 11; retainment means 12; and retainment receiving grooves 9 that may be used in practicing the invention. FIG. 8A retainment groove 11 disposed in the outer wall of insert 5 is substantially frusto-triangular shaped having a narrowest base formed by the bottom of groove 11 and whose widest base is the groove opening at the outer surface of insert 5 formed by the walls of groove 11 increasing in axial distance away from the central axis of the groove in a direction radially outwardly from the groove bottom. The retainment means 12 disposed in groove 11 of FIG. 8A has an oblong cross-sectional shape having its longest axis parallel to the axis of insert 5. The example was chosen to illustrate that the retainment means may itself be compressible and extend radially outwardly into retainment receiving groove 9 disposed in the inner wall of receiving bore 15. Receiving groove 9 in the inner wall of bore 15 of FIG. 8A has a substantially frusto-triangular cross-sectional shape for receiving a portion of retainment means 12 upon axial compression of insert 5. FIG. 8B illustrates an example where the walls of the retainment groove 11 in the wall of insert 5, shown in FIG. 8A, are curved; that retainment means 12 disposed in groove 11 has a circular cross-section; and that retainment receiving groove 9 in the inner wall of receiving bore 15 has a semi-circular cross-sectional shape. FIG. 8C illustrates another form wherein retainment groove 9 in the wall of insert 5 has a parabolic shaped cross-sectional; retainment means 12, disposed in groove 11, has a rectilinear shaped cross-section such as the square shown; and that retainment receiving groove 9 in the inner wall of receiving bore 15 has a rectilinear shaped cross-section such as the square shown. FIG. 8D illustrates where retainment means 12 disposed in groove 11 in the outer wall of insert 5 is not required to be solid and has a tubular cross-sectional shape with a hole therethrough for enhancement of deformable characteristics thereof. FIG. 8E shows one of the walls of retainment groove as curved to illustrate that it is not required that the walls of retainment groove 11 disposed in the outer wall of insert 5 be symmetrical. FIG. 8E also illustrates that retainment means 12, having a circular cross-sectional shape as shown in FIG. 8B, may be used with other grooves such as for example retainment groove 11 of FIG. 8E. FIG. 8F illustrates that retainment means 12 disposed in retainment groove 11 in the outer wall of insert 5 may comprise more than one component such as, for example, the combination of a component having a circular cross-sectional shape and a component having a modified rectilinear cross-sectional shape shown.

The above examples are for illustrative purposes and although it is preferred to use the combination of retainment groove 11 having a frusto-triangular cross-sectional shape; retainment means 12 having a substantially circular cross-sectional shape; and retainment receiving groove 9 having a frusto-triangular cross-sectional shape; any combination of cross-sectional shapes such as, for example, rectilinear, circular, oval, parabolic, triangular, hyperbolic, curvilinear, and the like, that suitably provide the rotatable interlocked relationship between body members 1 and 2 comprising the coupling member 10 of the invention is considered within the scope hereof.

FIG. 9 (A through D) illustrates various examples of embodiments that retainment means 12 may take in practicing the invention. FIG. 9A illustrates an embodiment where retainment means 12 comprises a segment having an arcuate form having a total circumferential length less than the circumferential length x taken at the point of contact of arcuate segment 12 and groove 11 hereinbefore described. FIG. 9B illustrates an embodiment where retainment means 12 comprises more than one arcuately formed segment having a total circumferential length less than the circumferential length x taken at the point of contact between annularly formed segment 12 and groove 11 hereinbefore described. It will be noted that FIG. 9C is actually an embodiment within the scope of FIG. 9B and is presented for illustrative purposes. It should also be recognized that one or any combination more than one of arcuately formed retainment means segment 12 may have a circumferential length greater than the circumferential length x taken at the point of contact with groove 11 hereinbefore described. In such an event over-lapping between one or more segment ends may result. It is to be also noted that retainment means 12 may comprise a circular shaped form having a continuous circular surface. In such an event, the circular form may require expansion before being placed into groove 11 hereinbefore described or insert 5 may be detachably segmented such that a circular shaped retainment means 12 may be placed into groove 11. FIG. 9D illustrates an embodiment where retainment means 12 comprises one or more rotatable spheres such as found, for example, in a ball bearing.

Figure 10A:
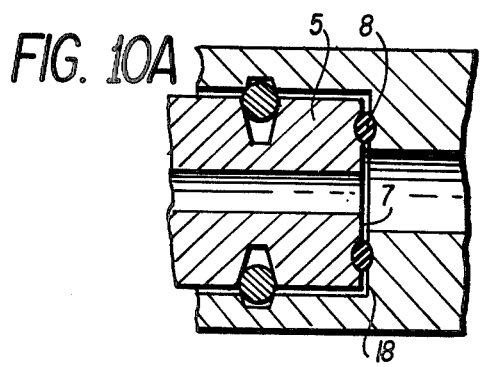
FIGS. 10A-B are a fragmented longitudinal section taken through the central longitudinal axis of two coupling members made in accordance with the invention.
Figure 10B:
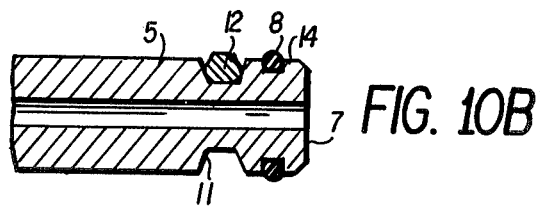

FIG. 10A illustrates an embodiment of the invention wherein resilient sealing means, such as O-ring 8, is disposed between outer end 7 of insert 5 and annular wall 18 hereinbefore described. FIG. 10B illustrates an embodiment wherein resilient sealing means, such as O-ring 8 is disposed in the outer surface of annular shoulder 14 at the outer end 7 of insert 5. Also shown in FIG. 10B is an example of a curvilinear cross-sectional shape related to retainment means 12 disposed in retainment groove 11 in the outer wall of insert 5.

Figure 11:
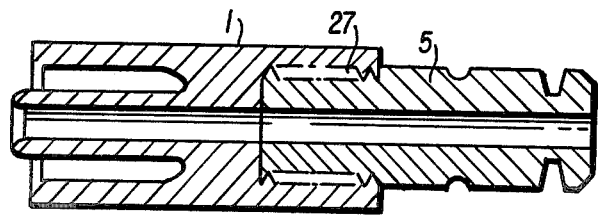
FIG. 11 is a longitudinal section taken through the central longitudinal axis of an embodiment of the invention.

FIG. 11 illustrates an embodiment wherein insert 5 extends away from the second end of body member 1 and is releasably attached thereto by threads 27 disposed on the end of insert 5 adjacent the second end of body member 1.

Figure 12:
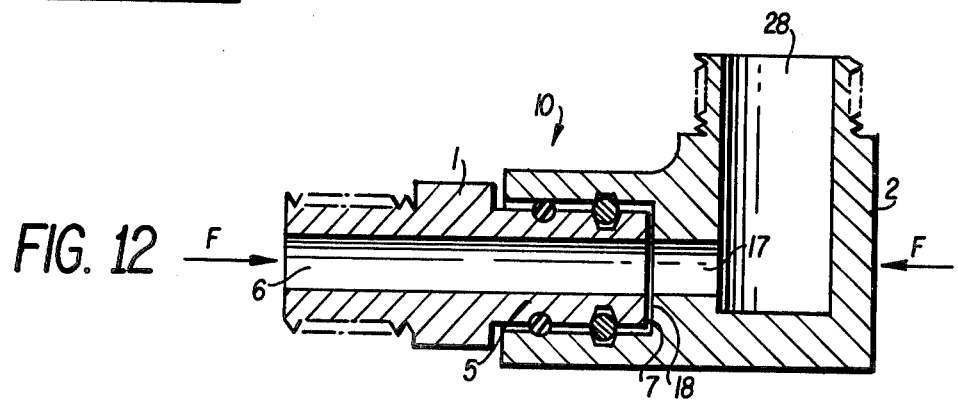
FIG. 12 is a section taken through the central axis of a coupling member embodiment made in accordance with the invention having a releasably attached insert.

FIG. 12 illustrates an embodiment of coupling member 10 made in accordance with the invention wherein body member 2 has more than one bore disposed therein such as, for example, bore 28 in the first end of body member 2 which intersects bore 17 in the second end of body member 2 and provides a fluid interconnecting relationship between the first and second ends of body member 2. Bore 17 is axially aligned with bore 6 extending through body member 1. In the embodiment shown, insert 5 may be axially compressed by applying a compressive force F such that the outer end 7 of insert 5 is pressed against annular wall 18 of body member 2 as hereinbefore described.

Figure 13A:
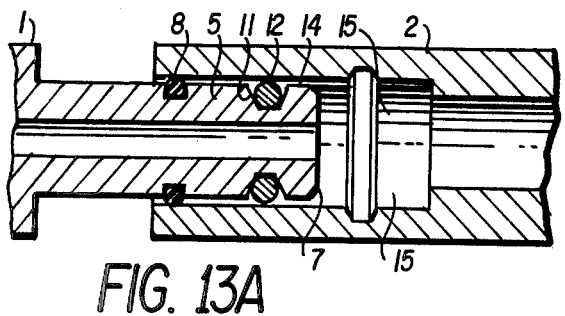
FIGS. 13A-C are a series of fragmented longitudinal sections showing one method of providing a rotatable interlocking relationship between members of an embodiment of a coupling made in accordance with the invention.
Figure 13B:
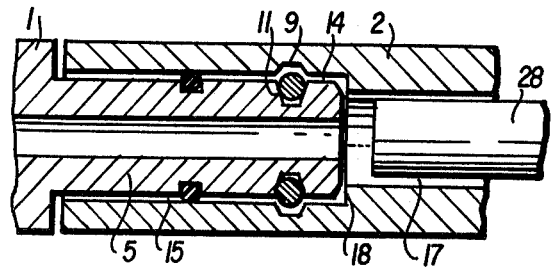
Figure 13C:
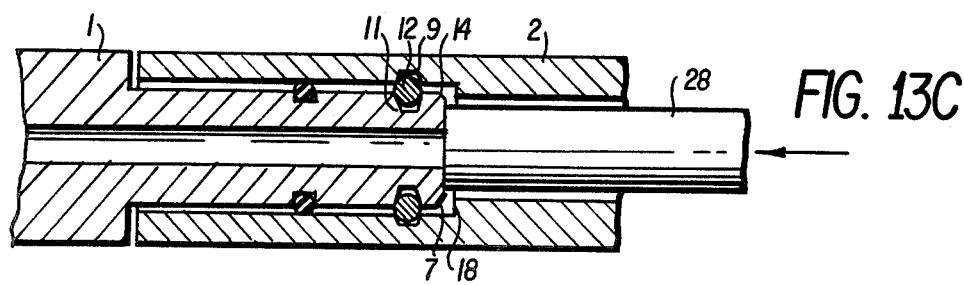

FIG. 13 illustrates one method of making an embodiment of coupling member 10 of the invention wherein insert 5, shown in FIG. 13A, extends away from the second end of body member 1 and has resilient sealing means, such as O-ring 8, disposed in the outer wall thereof. Retainment means 12 is disposed in annular retainment groove 11 in the outer wall of insert 5 and is axially spaced from outer end 7 thereof to provide an annular shoulder 14 therebetween. In FIG. 13A insert 5 is partially inserted into receiving bore 15 disposed at the first end of body member 2. In FIG. 13B, insert 5 is positioned into receiving bore 15 such that retainment groove 11 is substantially aligned with annular retainment receiving groove 9 disposed in the inner wall of bore 15. A suitable mandrel 28 is inserted into bore 17 from the second end of body member 2 in axially aligned relationship with insert 5. In FIG. 13C, mandrel 28 is directed against outer end 7 of insert 5 to axially compress insert 5 and cause alteration of the cross-sectional shape of groove 11 in such a manner as to cause a portion of retainment means 12 to extend into retainment receiving groove 9 to provide a rotatable interlocked relationship between body members 1 and 2. An alternate method, as hereinbefore described, would be to compress the outer end 7 of insert 5 against a suitable annular wall 18 disposed in body member 2 and facing the outer end 7 if such is provided and preferred.

Body members 1 and 2 of the invention may be made from any material having suitable fluid corrosive resistance and required physical properties. Although body members 1 and 2 may be made from a suitable metallic material such as, for example, steel, brass, aluminum, or the like, it is preferred to make body members 1 and 2 from a suitable alloy of brass. Body members 1 and 2 may also be made from a suitable polymeric material or filled polymeric material such as, for example, nylon, polyester, polyacetal, polyurethane, polyethylene, polypropylene, or the like. Sealing means 8 may be made from any material having the required fluid corrosive resistance and physical properties such as, for example, deformability, resilience, wear, or the like. Retainment means 12 of the invention may be made from any material having properties suitable for providing a rotatable interlocking relationship between body members 1 and 2 after having a portion thereof displaced radially outward from insert groove 11 into receiving groove 9. Retainment means 12 may be made from a metallic material such as, for example, steel, aluminum, brass, or the like. Retainment means 12 may also be made from a polymeric or filled polymeric material such as, for example, nylon, polyester, polyurethane, polyethylene, polypropylene, or the like. As in the case of body members 1 and 2 and sealing means 8, retainment means 12 may have lubrication additives therein for the purpose of enhancing a smooth rotatable relationship between body member 1 and 2.

An example of coupling member made in accordance with the invention has the following characteristics:

| (A) First Body Member: | |
|---|---|
| Material | Brass |
| Retainment Groove Cross-Sectional Shape | Frusto-Triangular |
| Insert Outer Wall Diameter | .623 Inch |
| Retainment Groove Location (center) from outer end of insert. | .173 Inch |
| Retainment Groove Characteristics: | |
| Bottom Width | .050 Inch |
| Depth of Groove | .087 Inch |
| Slope of Groove Walls from groove bottom axially away from central axis of groove. | 30 Degrees |
| Thickness of wall between groove bottom and inner wall of insert bore. | .029 Inch |
| Bore diameter through insert | .401 Inch |
| Total Axial length of insert | .625 Inch |
| (B) Second Body Member: | |
| Material | Brass |
| Retainment Receiving Bore Diameter | .625 Inch |
| Retainment Receiving Groove Cross-Sectional Shape. | Frusto-Triangular |
| Total Axial length of receiving bore | .600 Inch |
| Retainment Receiving Groove Characteristics: | |
| Bottom Width | .080 Inch |
| Groove Depth | .033 Inch |
| Slope of groove walls from groove bottom axially away from central axis of groove. | 30 Degrees |
| (C) Retainment Means: | |
| Material | Steel |
| Cross-Sectional Shape | Circular |
| Form - arcuate segment of wire having a circumferential length less than one-half of the circumferential length at the point of contact with the retainment groove disposed in the outer wall of the insert. | |

Upon axially compressing the insert of the above example to cause displacement of the wire (originally disposed in the retainment groove) such that a portion thereof extended into the retainment receiving groove of the second body member, it was found that body members 1 and 2 were provided with a rotatable interlocked relationship in accordance with the invention that required 950 pounds of force to separate.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A rotatable coupling member adapted for attachment to the end of a hose or tube to be used in the conveyance of a fluid under pressure comprising, a first body member in rotatable interlocked relationship with a second body member, said first body member having at least one bore extending therethrough providing a fluid interconnecting relationship between means for connecting the first body member to a source of fluid disposed at a first end thereof and the outer end of a substantially tubular shaped insert extending away from a second end of the first body member and having an annular retainment groove disposed in its outer wall, said second body member having a bore at a first end thereof axially aligned with the insert bore and having an inner wall disposed in receiving relationship about the outer wall of the insert and extending through at least one bore to a second end thereof having means for connecting the second body member to a source of fluid, an annular retainment receiving groove in the inner wall of the second body member receiving bore disposed in substantial axial aligned relationship radially outwardly from the retainment groove in the outer wall of the first body member insert, retainment means between the first and second body members extending radially outwardly from the first body member retainment insert groove into the substantially axially aligned retainment receiving groove in the inner wall of the second body member receiving bore as a result of axially compressing the first body member insert so as to cause the original cross-sectional shape of the insert retainment groove to be altered in such a manner as to displace the retainment means originally disposed therein radially outwardly to provide a rotatable interlocked relationship between the first and second body members, and resilient means for sealing against fluid leakage disposed between the rotatable interlocked first and second body members.

2. The coupling member of claim 1 wherein the second body member has a bore substantially axially aligned with the receiving bore disposed intermediate the outer end of the first body member insert and the second body member second end having a diameter thereof smaller than the diameter of the second body member receiving bore and providing an annular wall facing the insert outer end.

3. The coupling member of claim 1 wherein the retainment means comprises at least one segment having an arcuate form.

4. The coupling member of claim 1 wherein the retainment means has a circular form.

5. The coupling member of claim 1 wherein the retainment means comprises at least one rotatable spheres.

6. The coupling member of claim 1 wherein the retainment means has a substantially tubular cross-sectional shape.

7. The coupling member of claim 1 wherein the retainment means has a substantially rectilinear cross-sectional shape.

8. The coupling member of claim 1 wherein the retainment means is made from a metallic material.

9. The coupling member of claim 1 wherein the retainment means is made from a polymeric material.

10. The coupling member of claim 1 wherein the retainment means comprises a material having lubricant added thereto.

11. The coupling member of claim 6 wherein the retainment means is in the form of a wire.

12. The coupling member of claim 1 wherein the first body member insert has at least one axially spaced annular groove disposed in the outer wall thereof and the resilient means for sealing comprises a compressible material disposed in the grooves.

13. The coupling member of claim 12 wherein the compressible material is in the shape of an O-ring.

14. The coupling member of claim 1 wherein the first body member insert retainment groove has a substantially frusto-triangular cross-sectional shape having a narrower base formed by the bottom of the retainment groove and a broader base formed by the retainment groove opening in the insert outer wall provided by the walls of the groove increasing in axial distance from the central axis of the retainment groove radially outwardly from the groove bottom.

15. The coupling member of claim 14 wherein the walls of the insert retainment groove have a curved surface.

16. The coupling member of claim 1 wherein the retainment receiving groove in the second body member bore inner wall has a substantially frusto-triangular cross-sectional shape.

17. The coupling member of claim 1 wherein the means for connecting the first body member first end to a source of fluid comprises means for directly attaching the first body member first end to the end of a hose or tube used for conveyance of the fluid and the second body member second end connecting means comprises means for coupling the second end thereof to a fitting attached to a source of fluid.

18. The coupling member of claim 1 wherein the means for connecting the first body member first end to a source of fluid comprises means for coupling the first body member first end to a fitting attached to a source of fluid and second body member second end connecting means comprises means for directly attaching the end thereof to the end of a hose or tube for conveyance of the fluid.

19. The coupling member of claim 17 wherein the means for directly attaching the first body member first end to the end of the hose or tube comprises permanently attachable means.

20. The coupling member of claim 17 wherein the means for directly attaching the first body member first end to the end of the hose or tube comprises releasably attachable means.

21. The coupling member of claim 18 wherein the means for directly attaching the second body member second end to the end of the hose or tube comprises permanently attachable means.

22. The coupling member of claim 18 wherein the means for directly attaching the second body member second end to the end of the hose or tube comprises releasably attachable means.

23. The coupling member of claim 1 wherein the connecting means of the first body member first end and the second body member second end comprise means for direct attachment to the end of a hose or tube used for conveyance of the fluid.

24. The coupling member of claim 23 wherein the direct attachment means comprises permanently attachable means.

25. The coupling member of claim 23 wherein the direct attachment means comprises releasably attachable means.

26. The coupling member of claim 1 wherein the connecting means of the first body member first end and the second body member second end comprises means for coupling the ends to fittings attached to a source of fluid.

27. A coupling for a hose comprising a female member having a bore extending from a first end and a counterbore of smaller diameter communicating therewith, a wall about the counterbore forming a nipple adapted to be inserted in a hose end, an annular shell concentric with the nipple and spaced therefrom to accommodate the hose wall about the nipple, and a male member having a tubular portion disposed in said bore, said male member having an end portion integral with the tubular portion and disposed outside the counterbore adapted to connect the coupling to a source of fluid under pressure, an annular groove in the outer wall of the tubular portion disposed intermediate the connecting end thereof and an annular retainment groove disposed in the outer wall of the tubular member adjacent the end thereof opposite the connecting end, an annular retainment receiving groove disposed in the wall of the counterbore in substantial axial alignment with the tubular portion retainment groove, resilient sealing means disposed in the groove in the tubular portion adjacent the connecting end which presses against the counterbore to provide a rotatable fluid seal therebetween, and retainment means disposed between the counterbore and the tubular portion extending radially outwardly from the tubular portion retainment groove into the counterbore retainment receiving groove as a result of axially compressing the tubular portion so as to cause the original cross-sectional shape of the tubular portion retainment groove to be altered in such a manner as to displace the retainment means originally disposed therein radially outwardly to provide a rotatable interlocked relationship between the male and female members.

28. A coupling member for attachment to an end of a hose comprising a tubular member having a compressible wall and means for connecting said member to a source of fluid under pressure, and a second member having at one end thereof means for connecting said second member to an end of a hose and at its opposite end a cylindrical bore surrounded by a wall and adapted to receive said tubular member and extending through said second member into communication with a bore in said hose, said tubular member being disposed in said cylindrical bore, and means for rotatably securing said tubular member in said cylindrical bore comprising facing grooves in the walls of said cylindrical bore and said tubular member combining to form a retainment grove, a ring-like rigid member disposed in said groove in the wall of the tubular member, said tubular member being axially compressed with deformation of the groove therein which urges the ring-like member outwardly into the groove in the wall of the cylindrical bore thereby securing the two members against relative longitudinal movement and providing a bearing for relative rotation.

* * * * *